United States Patent [19]
Brill

[11] Patent Number: 6,150,736
[45] Date of Patent: *Nov. 21, 2000

[54] REDUNDANT ELECTRICAL POWER SOURCE, DISTRIBUTION AND CONSUMPTION SYSTEM

[76] Inventor: Kenneth G. Brill, 236 Camino De La Sierra, Santa Fe, N. Mex. 87501

[*] Notice: This patent issued on a continued prosecution application filed under 37 CFR 1.53(d), and is subject to the twenty year patent term provisions of 35 U.S.C. 154(a)(2).

[21] Appl. No.: 08/718,616

[22] Filed: Sep. 23, 1996

Related U.S. Application Data

[63] Continuation of application No. 08/524,112, Aug. 22, 1995, abandoned, which is a continuation of application No. 08/257,466, Jun. 8, 1994, abandoned, which is a continuation of application No. 07/843,313, Feb. 28, 1992, abandoned.

[51] Int. Cl.[7] ........................................ H02J 9/06

[52] U.S. Cl. ............................ 307/64; 307/19; 307/51; 307/66

[58] Field of Search ................................ 364/492, 273.4, 364/273.5; 307/18, 19, 43, 51, 69, 82, 84, 44, 47, 53, 56, 73, 64–66, 76, 113, 23, 30, 62, 72, 83, 85–87; 363/71, 65; 318/105–107, 109, 110, 99, 100, 440, 442

[56] References Cited

U.S. PATENT DOCUMENTS

| | | | |
|---|---|---|---|
| 3,398,292 | 8/1968 | Kuba | 307/51 |
| 4,114,048 | 9/1978 | Hull et al. | 307/53 |
| 4,323,788 | 4/1982 | Smith | 307/66 |
| 4,467,220 | 8/1984 | Page | 307/86 |
| 4,525,656 | 6/1985 | Kato | 318/100 |
| 4,607,330 | 8/1986 | McMurray et al. | 364/240 |
| 4,645,940 | 2/1987 | Wertheim | 307/66 |
| 4,897,563 | 1/1990 | Bahl | 307/113 |
| 5,012,121 | 4/1991 | Hammond et al. | 307/64 |
| 5,057,697 | 10/1991 | Hammond et al. | 307/66 |
| 5,081,367 | 1/1992 | Smith et al. | 307/64 |
| 5,138,184 | 8/1992 | Keefe | 307/64 |
| 5,194,757 | 3/1993 | Wertheim | 307/84 |

*Primary Examiner*—Albert W. Paladini
*Attorney, Agent, or Firm*—Iandiorio & Teska

[57] ABSTRACT

A system for distributing continuous, uninterrupted power to one or more critical, interdependent electrically powered devices comprising at least one power source; and at least first and second independent power distribution paths from the power source to the critical device or devices where power is consumed. This invention allows the protected electrical load(s) to continue functioning without interruption despite a power interruption or disturbance in a single power source and/or in a single power distribution path. The invention also allows one power source and/or one power distribution path to be taken out of service for maintenance or modification without causing a power interruption to the critical loads being served.

12 Claims, 2 Drawing Sheets

REDUNDANT ELECTRICAL POWER SOURCE, DISTRIBUTION AND CONSUMPTION SYSTEM

RELATED CASE

This application is a continuation of Ser. No. 08/524,112 filed Aug. 22, 1995 (now abandoned) which is a continuation of application Ser. No. 08/257,466 filed Jun. 8, 1994 (now abandoned) which is a continuation of application Ser. No. 07/843,313, filed Feb. 28, 1992 (now abandoned).

FIELD OF INVENTION

This invention relates to an integrated, fully redundant electrical power source, distribution and consumption system providing quality, continuous, uninterrupted power from multiple external a.c. quality power sources distributed via multiple independent external power paths to a critical load, requiring continuous availability of power, composed of many interrelated, but separate branch circuits.

BACKGROUND OF INVENTION

Many systems of electrical devices, such as computer and communication equipment, require continuous, uninterrupted, quality power. Many major data centers are currently working toward operating continuously twenty-four hours a day, seven days a week without shutdowns for maintenance or repairs. Such centers often contain many different computer systems which can have hundreds, even thousands of unique branch electrical circuits distributing power to interrelated, critical electrical devices. A power failure or even disturbance in just one branch circuit can disable the entire data center and result in hours of lost time while computer systems are restored and data recovered.

Previous power protection schemes have focused either on providing an uninterruptible source of power, or on providing redundancy within individual computer elements. Despite having 3 potential power sources (commercial utility power, generators, and batteries), uninterruptible power supplies (UPS) can and do fail with distressing frequency. Even if the UPS is totally successful in providing a source of uninterruptible power, it provides no protection if an electrical problem occurs after power has left the UPS's output bus.

At the ends of the hundreds of individual power distribution branch circuits that make up a complex computer system, attempts have been made to provide multiple power supplies with elaborate means for switching supplies as quickly as possible upon detection of a fault, such as an undervoltage situation or an internal power supply failure. Such approaches also can include battery backup for limited time operation in case of an input power failure. Previous patents cover a number of alternatives for how internal power supply redundancy and/or batteries can be employed, but such systems are supplied by a common path back to a common power source. Since power must continuously be fed through such commonalities, a failure in a portion of the power path or in the source of power will shutdown the entire system. Furthermore, these continuously powered portions can never be removed from service for maintenance or modification which is unacceptable if non-stop computer operation is to be achieved.

To summarize the current state of the art: 1. UPS systems by themselves are not sufficiently reliable to provide truly uninterrupted power. 2. UPS systems provide no or limited protection from short circuits, circuit breaker failures, wire failures, transformer failures, plug, receptacle or connection failures, load induced failures and problems, human error, or other problems that typically occur after conditioned power leaves the UPS output bus. 3. Current systems for delivering power to branch circuits follow a single path which can not be taken out of service for maintenance, repair, or modification without powering down the dependent equipment. 4. While the equipments powered by the branch circuits contain a growing sophistication of internal power supply redundancy, these power supplies are ultimately connected to a single power source via a single input power cord or hardwired power path.

SUMMARY OF INVENTION

It is therefore the object of this invention to provide an integrated system for creating and delivering continuous, uninterrupted power to one or many interrelated and interdependent electrical devices.

It is the further object of this invention to provide a distribution system in which a fault, interruption, malfunction, or human error in a single source or anywhere along a single power path will not affect the operation of the total system.

It is the further object of the invention to provide a system for intentionally removing one power source and/or one power path for maintenance, repair, or modification without disrupting the functionality of the loads being served.

It is a further object of this invention to prevent disturbances induced by the load in a single branch from affecting other branches through their interconnected common power path.

It is a further object of this invention to permit flexibility in how the multiple power paths are utilized by the devices being served. One approach is to have two or more power supplies for each load that are simultaneously energized from more than one power path so that a power disturbance or outage has no effect. Depending upon the internal characteristics of the particular branch device loads being served, many options exist for how the individual internal power supplies may be configured. It is even possible that for some loads including motors, a power supply (or power supplies) with a single input could be used with a suitably fast switch to transfer from one power path to another, but this approach would not take full advantage of the invention because the switch itself might become a single point of failure.

DISCLOSURE OF PREFERRED EMBODIMENT

Other objects, features and advantages will occur to those skilled in the art from the following description of preferred embodiment and the accompanying drawings, in which.

Figure 1:
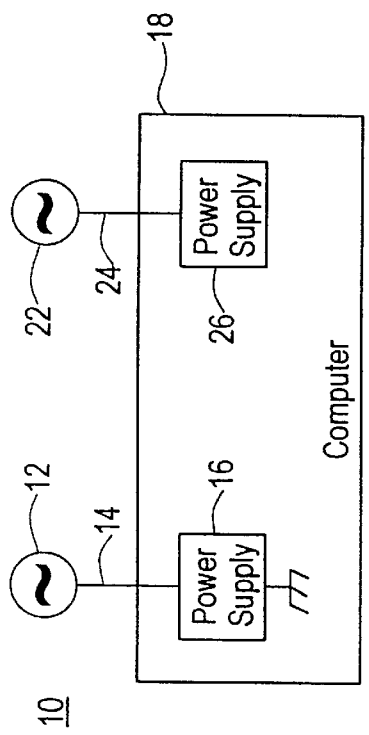
FIG. 1 is a block diagram of a system for accomplishing this invention.

There is shown in FIG. 1 a system 10 for distributing continuous, uninterrupted power to a computer system 18. System 10 includes independent power sources 12 and 22 that supply power via independent distribution paths 14 and 24 to independent internal power supplies 16 and 26 within the computer, communication, or critical electronic system 18.

Power sources 12 and 22 could be electric utility services, power conditioners such as transient protectors, voltage regulators or similar power quality conditioning devices, uninterruptible power supplies, batteries, and generators or any combination thereof. The term "power supply" used to describe 16 and 26 is not intended to prevent a motor or any other load not requiring a power supply from being the consumer of the electrical energy supplied by power paths 14 and 24.

In actual practice, a typical system 10 might be comprised of hundreds of separate critical loads each represented by 18. System 10 has no single point of potential power failure and all elements of the system can be maintained without interruption to critical computer system processing. That is, a failure or disturbance along any one power path, including the power source or the internal load power supply, will have no effect on the continued operation of the computer, communication, or electronic system.

The system illustrated in FIG. 1 uses two power supplies, two power paths, and two power sources, but this is not an inherent limitation. Any number greater than one is acceptable. One of the drawbacks to the system illustrated in FIG. 1 is that when a portion of the system is disabled for maintenance or repair activities, a single disturbance or failure in the active portion may cause a system failure. This vulnerability can be overcome by using three or more redundant elements.

Figure 2:
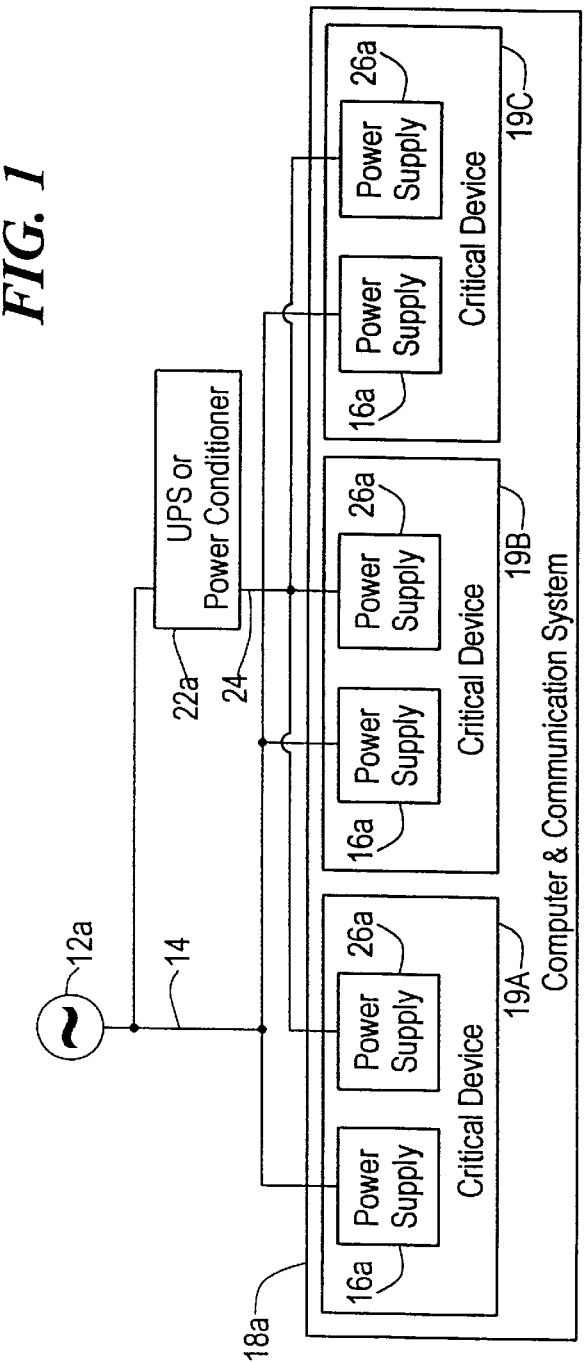
FIG. 2 is a more detailed example of how FIG. 1 may be applied.

While the system shown in FIG. 1 uses two totally independent redundant elements, it is possible to use less than two power sources 12 and 22 and still get many of the invention's benefits. For example, as shown in FIG. 2, one application might use a single commercial utility power source 12a. This power source would be common to power path 14 and input to a power conditioner or uninterruptible power supply 22a. The output of 22a would be the independent power source for power path 24. Power paths 14 and 24 would distribute power to critical devices 19A, 19B, and 19C which together comprise all the electrical consumption of computer system 18a. The three devices, 19A–19C, shown on FIG. 2 are not intended to be a limitation. In actual practice, computer system 18a might be composed of literally hundreds of critical, functionally interrelated devices without limit. In fact, devices 19A–19C might actually represent entire interrelated and/or interdependent computer, communication, electronic, or other systems each of which in turn are composed of multiple interrelated devices.

The configuration shown in FIG. 2 provides many of same benefits as FIG. 1 at lower cost provided a malfunction does not simultaneously occur in the UPS or power conditioner 22a and the common utility power source 12a. Many variations of FIG. 2 are possible based on the degree of power protection desired and the amount of investment available.

Both independent power supplies 16 and 26 shown in FIG. 1 are preferably energized continuously so that they are always known to be working and there is no transfer time if a failure occurs. However, the system may also be operated with only one power supply if a suitable means for transferring the protected load(s) to an alternate power supply(s) or to an alternate power path is included so that a disruption does not affect the operation of the critical device(s). Examples of how device power supplies can be internally connected to accomplish such switching are shown in U.S. Pat. Nos. 4,607,330, 3,679,571, and 4,638,175, all incorporated by reference.

Figure 3:
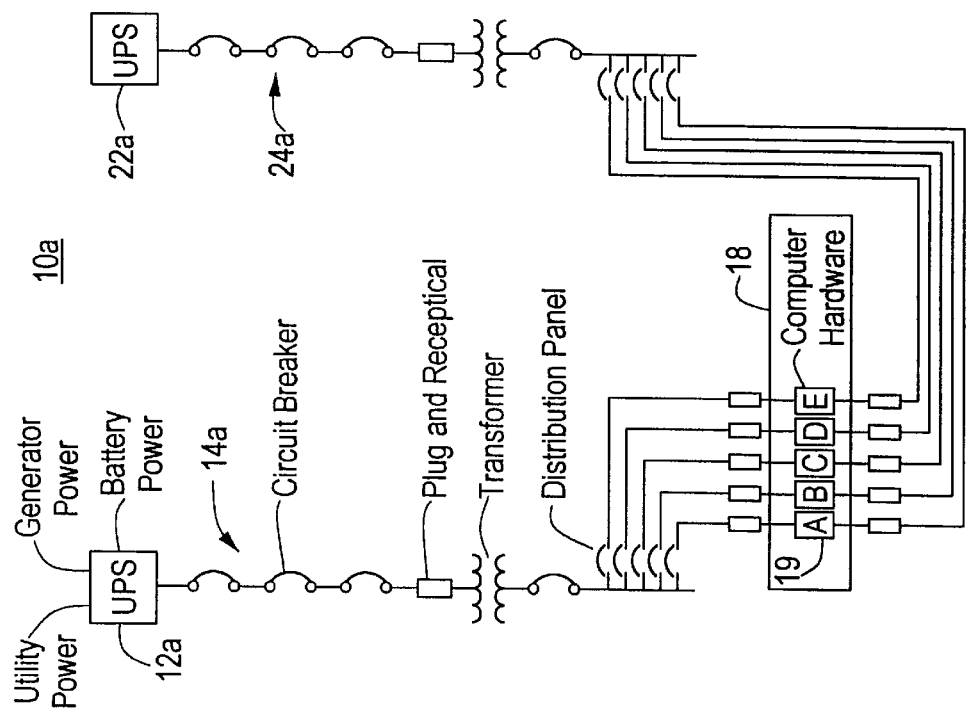
FIG. 3 is a more detailed schematic diagram of FIG. 1.

FIG. 3 discloses one more detailed application of FIG. 1 for uninterruptibly generating and distributing power to critical computer hardware equipment devices 18A through 18E. Each such critical equipment device would have redundant and independent internal power supplies such as 16a and 26a of FIG. 2 which would be connected respectively to external independent power distribution paths 14a and 24a. Included within power source 12aa is uninterruptable power supply 27 which may be powered by utility power 28, generator power 29 and/or battery power 30. Power source 22aa which is an uninterruptable power supply may be similarly powered. Included within the external power distribution path would be wires, conduit, plugs, receptacles, connections, connectors, circuit breakers, fuses, transformers, electrical panels, surge suppressors, and other circuit elements typically required to safely conduct electrical energy from a source to a load. Each power distribution path 14a and 24a would be supplied by raw power or by independent power conditioners or by uninterruptible power supply systems (or a combination thereof) 27 and 22aa which would receive energy from the commercial electric utility, from generators, or from batteries.

Although specific features of the invention are shown in some drawings and not in others, this is for convenience only as each feature may be combined with any or all of the other features in accordance with the invention.

Other embodiments will occur to those skilled in the art and within the following claims:

What is claimed is:

1. An external, intermediate power distribution and maintenance system for distributing continuous, uninterrupted power to at least one electrically powered critical device, comprising:

at least two AC power sources electrically independent of each other external of said at least one critical device; and at least two a.c. power distribution paths electrically independent of each other and external of said power sources and said at least one critical device; wherein each said critical device is simultaneously electrically connected to said at least two independent a.c. power sources by said at least two independent a.c. power distribution paths, and wherein each said path is exclusively energized by a different said source.

2. The system of claim 1 in which at least one of said power sources includes an uninterruptible power supply.

3. The system of claim 1 in which at least one of said power sources includes a power conditioner.

4. The system of claim 1 in which at least one of said power sources includes a generator.

5. The system of claim 1 in which at least one of said power sources includes an electric utility service.

6. The system of claim 1 in which said power sources each include at least two independent power sources.

7. The system of claim 6 in which said at least two independent power sources are selected from the group consisting of electric utility services, generators, uninterruptible power supplies, and power conditioners.

8. The system of claim 1 in which each said at least one critical device includes means for utilizing power supplied from said power sources.

9. The system of claim 8 in which said means for utilizing power includes a power supply.

10. The system of claim 1 in which each critical device includes at least two simultaneously energized redundant power supplies.

11. An external, intermediate power distribution and maintenance system for ensuring continuous a.c. power delivery to at least one critical device along remaining energized power distribution paths should one or paths become de-energized or out of tolerance, comprising:

at least one electrically powered critical device with at least two a.c. power inputs electrically independent of each other capable of continuous uninterrupted operation should one or more of its a.c. inputs become de-energized or out of tolerance;

at least two a.c. power sources electrically independent of each other and external of said at least one critical device; and at least two a.c. power distribution paths electrically independent of each other and external of said power sources and each said critical device; wherein each said critical device is simultaneously electrically connected to said at least two independent a.c. power sources through said at least two independent a.c. power distribution paths, and wherein each said path and input is distribution paths as a result of a fault occurring on said paths or for maintenance.

12. An external, intermediate power distribution and maintenance system for distributing continuous, uninterrupted power to an electrically powered critical device, comprising:

an electrically powered critical device having first and second a.c. inputs electrically independent of each other;

first and second a.c. power sources electrically independent of each other and external of said critical device;

a first a.c. power distribution path external of said critical device and said power sources interconnecting the first input of said critical device to said first a.c. power source such that said first path and the first input are electrically energized exclusively by said first source; and a second a.c. power distribution path external of said critical device and said power sources interconnecting the second input of said critical device to said second a.c. power source such that said second path and the second input are electrically energized exclusively by said second source.

* * * * *